350-174

CROSS REFERENCE

SEARCH ROOM

95/1.1

Nov. 26, 1963 W. G. ALEXANDER 3,111,887

X2546

DATA CARD RECORDING SYSTEM

Filed Dec. 27, 1960

INVENTOR.
WILLIAM G. ALEXANDER
BY
Knox & Knox

United States Patent Office 3,111,887

Patented Nov. 26, 1963

3,111,887

DATA CARD RECORDING SYSTEM

William G. Alexander, San Diego, Calif., assignor, by mesne assignments, to Craig Systems, Inc., Lawrence, Mass., a corporation of Massachusetts Filed Dec. 27, 1960, Ser. No. 78,754
2 Claims. (Cl. 95—1.1)

This invention relates to a recording system, and more particularly to the recording and storing of a plurality of different types of information on a single card.

Two types of information recording and storage systems are receiving wide acceptance, each having its own advantages and disadvantages. The first type is the "punched card," wherein data is impressed on a card in the form of holes punched at strategic areas of the card. Thus the presence or absence of holes at selected areas has predetermined significance.

One of the problems associated with storage of information is the need for "retrieval." This arises when a particular bit of information recorded on one of the cards is needed, and this card must be retrieved from a stack of cards. In the punched card system, a certain area of the card is called the "retrieval field," and holes punched in selected areas of the retrieval field are used to separate the desired card from the others.

For example, if the punched cards listed the books of a library, selected holes in the retrieval field would indicate the subject class of the book. In this way, a rapid, mechanical search of the cards would retrieve those cards listing books that dealt with a given subject.

The drawback of the punched cards is that they cannot store data such as pictures, drawings, charts, etc.

The second type of information storage is "microfilm;" wherein the desired data is photographed onto a film. This system can easily store pictures, drawings, and charts, as well as written and typed information. Its disadvantage lies in the difficulty of retrieval. Since each picture is on a given frame of a reel, every frame of every reel must be studied in a retrieval. Furthermore, once related frames are found, they cannot be grouped, but must remain with their particular reel. This difficulty is solved only by the use of involved indexes, and other cross references.

An attempt has been made to combine the advantages of the two systems. The compromise consisted of affixing a frame of microfilm to a window of a punched card. Theoretically, machines could now search for the desired card or cards, and the attached frame of film could then be used for display or reproduction purposes.

Unfortunately, no satisfactory method has been found for attaching the microfilm to the punch card. Not only is the attachment difficult, but it is not permanent. During the mechanical search, the tape or glue usually loosens, the film comes off, and the tacky tape or glue fouls up other cards and the machinery.

It is therefore the principal object of my invention to provide an improved recording system.

Figure 1:
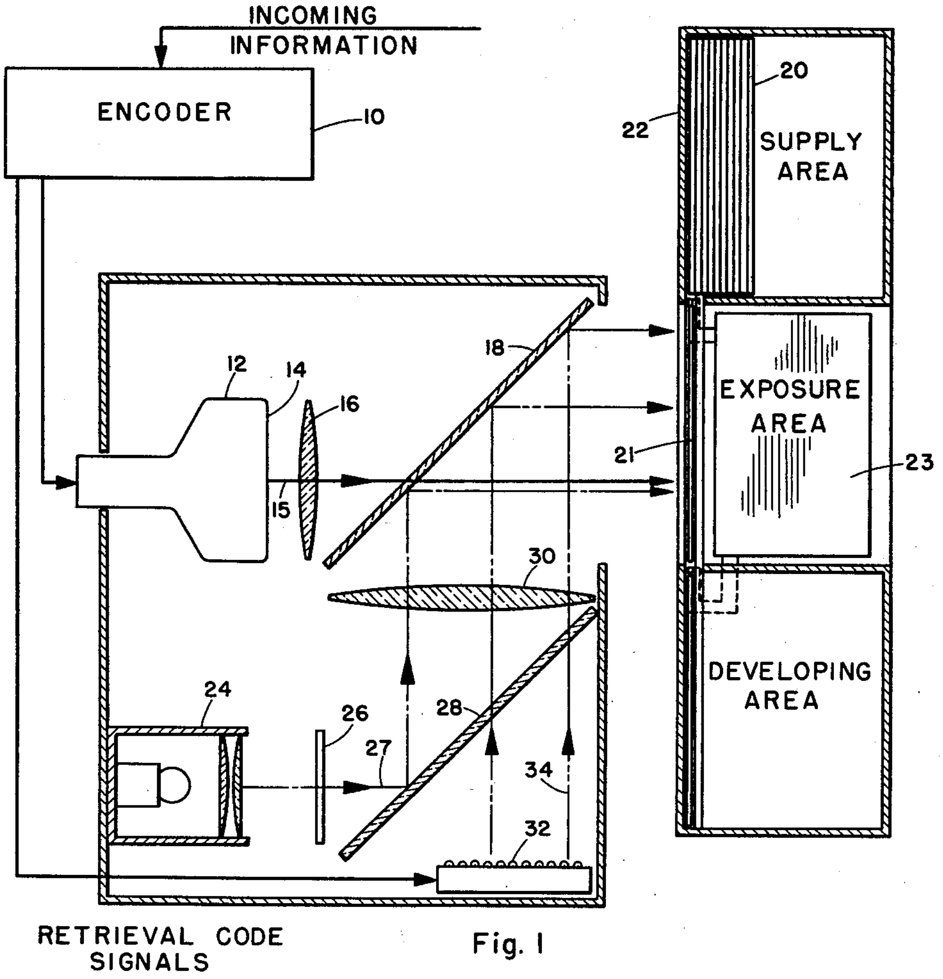
Figure 2:
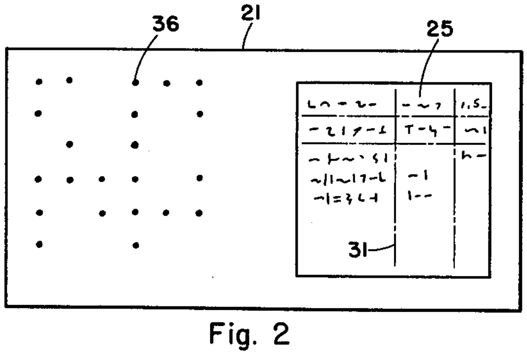

The attainment of this object and others will be realized from the following specification, taken in conjunction with the drawings, of which FIGURE 1 shows my basic inventive concept; and FIGURE 2 shows an example of a recording card produced by my invention.

My invention will be understood from FIGURE 1, which shows how three different kinds of information can be applied simultaneously to a single card. The incoming information is applied to an encoder 10, which may take any of several forms. If the incoming information is a picture—obtained from a camera, a facsimile system, or a similar source—encoder 10 converts the incoming information into electrical signals that when applied to cathode ray tube 12 produce a picture on the faceplate 14 of tube 12. If on the other hand, the incoming information is a code that corresponds to letters, number, symbols, etc., encoder 10 would produce electrical signals of such a form that cathode ray tube 12 would spell-out a message on its faceplate 14. In this way, the incoming information, regardless of its form or source, would cause an intelligible display on the faceplate of the cathode ray tube.

The light from the display shown by arrow 15, traverses an optical system 16, shown symbolically as a single lens, and then impinges on a semi-transparent mirror 18. This mirror has the characteristic that some light may pass therethrough, while other light is reflected from its surface. As shown, the light indicated by arrow 15 traverses semi-transparent mirror 18 as indicated.

In order to record the display, I use a card having a photosensitive surface. A supply 20 of these cards is stored in a card magazine 22, where the cards are protected from light. When data is to be recorded, encoder 10 energizes the advance mechanism, not illustrated, of card magazine 22, and a single card 21 is fed from supply 20 to the exposure area 23. When the card 21 is suitably positioned at the expose station, light from the display is imaged thereon by optical system 16. As will be shown later, the image of the display is restricted to a desired portion of the card 21.

There are times when the imaged display is most conveniently positioned in certain areas of a standardized format. To achieve this effect, a "form" of suitably positioned lines is simultaneously imaged onto the card positioned in the expose area of the card magazine. This is done by using a projector 24 to project light through a transparency 26 having the desired arrangement of lines thereon. This light from the "format" is reflected from the surface of a second semi-transparent mirror, traverses a second optical system 30, and then is reflected from the first semi-transparent mirror 18 to card 21 at the exposure area 23. As shown in FIGURE 2, the card 21 has lines 31 that border specific parts of the display portion 25 of card 21.

It was previously pointed out that it was important that a certain card or cards be selected, or "retrieved" from a stack of cards. In order to achieve retrieval, I use a panel 32 of lamps of which selected lamps are illuminated by retrieval code signals from encoder 10. The pattern of light produced by the selectively illuminated lamps, is directed as shown by arrow 34. The light traverses semi-transparent mirror 28 and optical system 30, and is reflected by semi-transparent mirror 18 to the exposure station 23. As shown in FIGURE 2, the light from the retrieval panel is directed to the retrieval field portion 36 of the card.

It may at times be desired that the image portion have a better resolution than the retrieval field; or that the retrieval field have a poorer resolution than the image portion. This may be achieved during the preparation of the photosensitive surface of the card, but of course introduces the necessity of carefully positioning the cards in the same way.

By using my invention as above described, the card has received a display, a retrieval pattern, and—if desired—a pattern of lines to enclose selected portions of the display.

Once the card at the expose station has received the desired information, it is moved to a developing area, and the photosensitive surface of the cards is then processed. The resultant unitary cards may then be mixed, stored, shuffled, sorted, searched, etc., in any desired manner.

When it is desired to retrieve a given card, or group of cards from the stack, a readout mechanism scans the retrieval field, and picks out those cards having the proper retrieval code.

It will be realized that the cathode ray tube, projector, lamps, optical systems, and mirrors are exemplar only; and that other suitable arrangements may be used.

Apparatus and principles for moving and positioning the cards, and for their development are well known, and will therefore not be described in detail. However, it should be pointed out that the card developing process may include the usual chemical treatment, heat treatment, electrostatic printing, or magnetic printing. The type of treatment will depend upon the kind of equipment that is to be used for retrieval and readout.

It will be seen that my invention has many advantages over prior-art data recording and storage systems. First, it is capable of storing pictures, drawings, charts, etc. These are a unitary part of the card, and cannot become detached or lost. Secondly the unitary card has retrieval data incorporated thereon, so that cards may be readily selected by automatic readout and retrieval apparatus.

It is understood that minor variation from the form of the invention disclosed herein may be made without departure from the spirit and scope of the invention, and that the specification and drawing are to be considered as merely illustrative rather than limiting.

I claim:

1. The combination comprising:

a card magazine having a supply area for holding a supply of photosensitive cards, means comprising an exposure area for exposing a selected card, and means, comprising a developing area for developing an exposed card;

means, comprising a cathode ray tube, for producing a display;

means, comprising an encoder, for converting incoming signals into signals that cause said cathode ray tube to produce a display corresponding to said incoming signals;

means, comprising a signal from said encoder, for causing a single card to advance from the supply area to the exposure area;

means, comprising on optical system and a first semi-transparent mirror, for imaging said display onto a first portion of a card positioned in said exposure area;

means, comprising a signal from said encoder, for producing a pattern of lights defining a retrieval code corresponding to said incoming signals;

means for imaging said retrieval code onto another portion of said card positioned in the exposure area comprising a second semi-transparent mirror, a second optical system, and said first semi-transparent mirror, whereby said card has a display and a format of lines in a first portion thereof, and a retrieval code in another portion thereof;

and means, comprising a signal from said encoder, for advancing said exposed card from the exposure area to the development area, whereby a unitary card is produced having three types of information thereon.

2. The combination comprising:

a card magazine for holding a supply of photosensitive cards, means, comprising an exposure area for exposing a selected card, and means, comprising a developing area for developing an exposed card;

means, comprising a cathode ray tube, for producing a display;

means, comprising an encoder, for converting incoming signals into signals that cause said cathode ray tube to produce a display corresponding to said incoming signals;

means, comprising a signal from said encoder, for causing a single card to advance from the supply area to the exposure area;

means, comprising an optical system and a first semi-transparent mirror, for imaging said display onto a first portion of a card positioned in said exposure area;

a transparency comprising a format of lines;

means for imaging said format of lines onto said first portion of said card positioned in said exposure area, said means comprising a second optical system, a second semi-transparent mirror; and said first semi-transparent mirror;

means, comprising a signal from said encoder, for producing a pattern of lights defining a retrieval code corresponding to said incoming signals;

means for imaging said retrieval code onto another portion of said card positioned in the exposure area, said means comprising said second semi-transparent mirror, said second optical system, and said first semi-transparent mirror, whereby said card has a display and a format of lines in a first portion thereof, and a retrieval code in another portion thereof;

and means, comprising a signal from said encoder, for advancing said exposed card from the exposure area to the development area, whereby a unitary card is produced having three types of information thereon.

References Cited in the file of this patent

UNITED STATES PATENTS

| | | |
|---|---|---|
| 1,636,834 | Peters | July 26, 1927 |
| 2,355,268 | Bryce | Aug. 8, 1944 |
| 2,508,562 | Bonner | May 23, 1950 |
| 2,760,418 | Hawn | Aug. 28, 1956 |
| 2,796,800 | Klemperer | June 25, 1957 |
| 2,893,123 | Bach | July 7, 1959 |
| 2,907,985 | Doersam | Oct. 6, 1959 |
| 2,978,968 | Schwertz | Apr. 11, 1961 |